US012126129B1

(12) United States Patent
Bie

(10) Patent No.: US 12,126,129 B1
(45) Date of Patent: Oct. 22, 2024

(54) MULTIFUNCTIONAL DATA CABLE

(71) Applicant: Zhi Bie, Chengdu (CN)

(72) Inventor: Zhi Bie, Chengdu (CN)

( * ) Notice: Subject to any disclaimer, the term of this patent is extended or adjusted under 35 U.S.C. 154(b) by 0 days.

(21) Appl. No.: 18/648,008

(22) Filed: Apr. 26, 2024

(30) Foreign Application Priority Data

Mar. 8, 2024 (CN) ......................... 202420451680.8

(51) Int. Cl.
*H01R 31/06* (2006.01)
*H01R 13/627* (2006.01)

(52) U.S. Cl.
CPC ......... *H01R 31/06* (2013.01); *H01R 13/6273* (2013.01)

(58) Field of Classification Search
CPC . H01R 31/06; H01R 13/6273; H01R 13/6205
See application file for complete search history.

(56) References Cited

U.S. PATENT DOCUMENTS

| | | | | |
|---|---|---|---|---|
| 7,824,211 | B1 * | 11/2010 | Wu | H01R 31/06 439/732 |
| 7,850,476 | B2 * | 12/2010 | Good | H01R 31/06 439/352 |
| 8,512,053 | B2 * | 8/2013 | Worth | H01R 31/06 439/502 |
| 9,515,442 | B2 * | 12/2016 | Cymerman | H01R 13/64 |
| 9,935,391 | B2 * | 4/2018 | Wang | H01R 13/514 |
| 9,991,657 | B2 * | 6/2018 | Powers | H01R 31/06 |
| 10,340,623 | B2 * | 7/2019 | Beimdieck | H01R 31/06 |
| 10,374,373 | B1 * | 8/2019 | Chen | G02B 6/4274 |
| 10,817,453 | B2 * | 10/2020 | Abdul-Razzak | G06F 1/1632 |
| 11,025,019 | B1 * | 6/2021 | Cheng | H01R 27/00 |
| 11,050,202 | B1 * | 6/2021 | Wang | H01R 13/50 |
| 11,050,203 | B2 * | 6/2021 | Czarnecki | H01R 24/30 |
| 11,101,584 | B2 * | 8/2021 | Tan | H01R 35/04 |
| 11,180,043 | B2 * | 11/2021 | Rönfanz | H01R 13/665 |
| 11,217,951 | B2 * | 1/2022 | Huang | H02J 3/06 |
| 11,502,467 | B2 * | 11/2022 | Deng | H01R 13/6205 |
| 11,626,688 | B2 * | 4/2023 | Patel | H02G 15/115 439/462 |
| 11,855,380 | B2 * | 12/2023 | Yao | H01R 13/4226 |

* cited by examiner

*Primary Examiner* — Thanh Tam T Le
(74) *Attorney, Agent, or Firm* — Jeenam Park

(57) ABSTRACT

An outdoor multifunctional data cable is provided, which includes a data cable body, an end of the data cable body is provided with a data joint, the data joint includes a first joint. The data cable body is movably connected to a portable electrical module through a connecting mechanism, the portable electrical module is provided with a second joint. The portable electrical module is electrically connected to the first joint through the second joint. The data cable body in the present disclosure is movably connected to various optional portable electrical modules, a transmission function is retained, and an application of the data cable is also increased, thereby improving a practicality of the data cable; the portable electrical module and the data cable body are integrally connected, which can effectively prevent a loss of the portable electrical module during use and enhance the portability of portable electrical module.

7 Claims, 6 Drawing Sheets

MULTIFUNCTIONAL DATA CABLE

CROSS-REFERENCE TO RELATED APPLICATIONS

This application claims priority to Chinese Patent Application No. 202420451680.8, filed on Mar. 8, 2024, which is hereby incorporated by reference in its entirety.

TECHNICAL FIELD

The present disclosure relates to the field of electrical installation technologies, and in particular, to an outdoor multifunctional data cable.

BACKGROUND

Data cables, in daily life applications, generally refer to wires with data and current transmission functions, and include wires with only current transmission functions. Their application range is very wide, especially in today's world where universal serial bus (USB) interfaces are widely used in various electrical components, the data cables can be seen everywhere.

However, to this day, data cables are only endowed with an identity of transmission media. Although it is essential, they can only be auxiliary consumables and cannot play a greater role in achieving greater value.

SUMMARY

The purpose of the present disclosure is to provide an outdoor multifunctional data cable, which is connected to various optional portable electrical modules on a main body of the data cable, its transmission function is retained, an application function of the data cable is also increased, thereby improving a practicality of the data cable, and solving the problem proposed in the background.

To achieve the above objectives, the present disclosure provides the following technical solution: a multifunctional data cable, including a data cable body, an end of the data cable body is provided with a data joint, the data joint includes a first joint, where the data cable body is movably connected to a portable electrical module through a connecting mechanism, the portable electrical module is provided with a second joint, the portable electrical module is electrically connected to the first joint through the second joint.

In an embodiment, the connecting mechanism includes a hinge arm integrally connected to the portable electrical module, a hinge frame fixed at a first joint base of the data cable body, and a hinge bolt that connects the hinge arm and the hinge frame in series and is movably connected to the hinge frame.

In an embodiment, the connecting mechanism is magnetic suction components that are connected to each other by mutual magnetic suction, the magnetic suction components are respectively provided on the portable electrical module and the first joint base of the data cable body to achieve a magnetic suction connection between the portable electrical module and the first joint base.

In an embodiment, the portable electrical module is a lighting module, the lighting module includes a device housing, the device housing is in a shape of a tubular, an end of the device housing is provided with a luminous bead, an illumination direction of the luminous bead is facing towards an outer side of the device housing, an outer side of the luminous bead is covered with a lampshade, the device housing is internally provided with a circuit board component, the electrical circuit board component is electrically provided with a lighting switch and a second joint, where the lighting switch is provided in a predetermined through-hole of the device housing, the second joint is provided at an end of the device housing away from the luminous bead.

In an embodiment, a second joint base is provided between the second joint and the device housing, and the second joint base is configured to fix the second joint.

In an embodiment, the portable electrical module is an ignition module, the ignition module includes a device housing, the device housing is in a shape of a tubular, an end of the device housing is provided with a heating wire module, the device housing is internally provided with a circuit board component, the circuit board component is electrically provided with an ignition switch and a second joint, the ignition switch is provided in a predetermined through-hole of the device housing, the second joint is provided at an end of the device housing away from the heating wire module.

In an embodiment, a second joint base is provided between the second joint and the device housing, and the second joint base is configured to fix the second joint.

In an embodiment, the first joint is a Type-C plug, the second joint is a Type-C socket, the portable electrical module achieves a detachable connection and a hot swappable electrical connection through mutual insertion of the Type-C plug and Type-C socket.

Compared with existing technologies, the beneficial effects of the present disclosure are:

the data cable body of the present disclosure connects various optional portable electrical modules, the transmission function is retained, and an application function of the data cable is increased, thereby improving its practicality. At the same time, the portable electrical module and the data cable body are integrated and movably connected, which effectively preventing a loss of the portable electrical module during use and improving the portability of the portable electrical module.

Numeral reference: 1. Data cable body; 11. Data joint; 111. First joint; 112. First joint base; 2. Connecting mechanism; 21. Hinge arm; 22. Hinge bolt; 23. Hinged frame; 3. Portable electrical module; 31. Lampshade; 32. Luminous bead; 33. Device housing; 34. Circuit board component; 341. Second joint; 342. Lighting switch; 343. Ignition switch; 35. Second joint base; 36. Heating wire module.

DESCRIPTION OF EMBODIMENTS

The following will provide a clear and complete description of the technical solution in the embodiments of the present disclosure, in combination with the accompanying drawings. Obviously, the described embodiments are only a part of the embodiments of the present disclosure, not all of them. Based on the embodiments in the present disclosure, all other embodiments obtained by those skilled in the art without creative work fall within the protection scope of the present disclosure.

Figure 1:
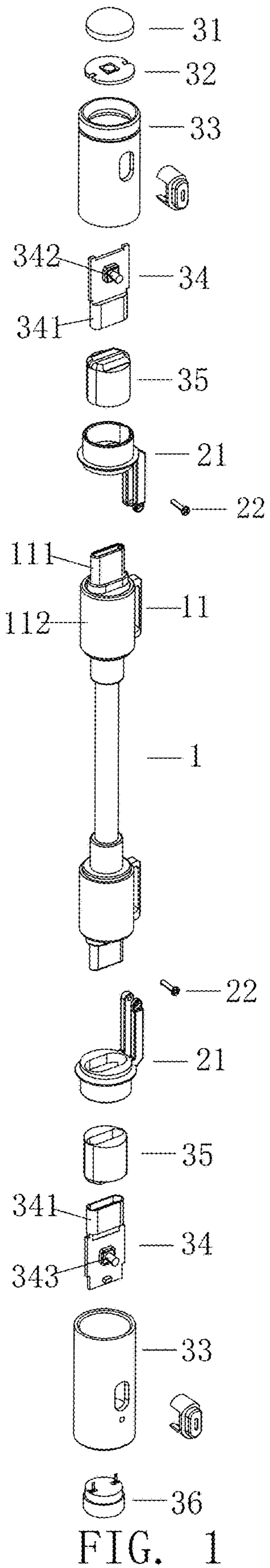
FIG. 1 is a first exploded structural view of the present disclosure.
Figure 2:
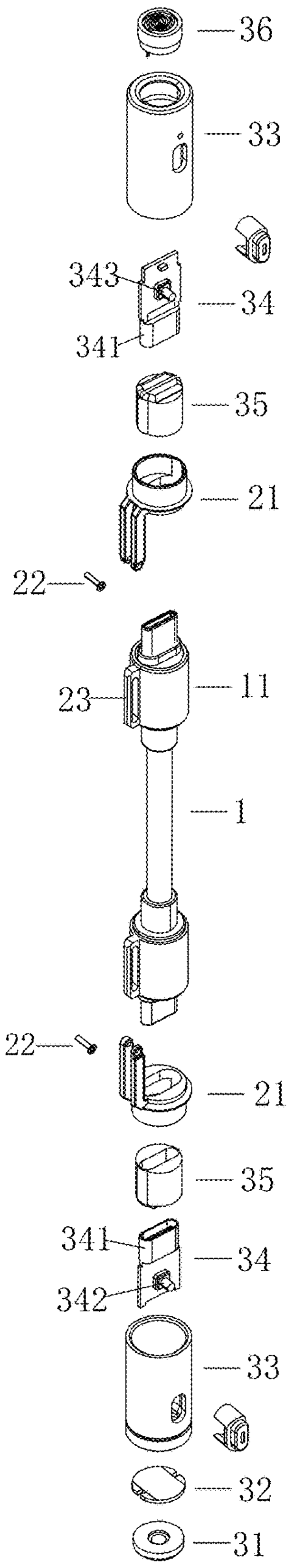
FIG. 2 is a second exploded structural view of the present disclosure.
Figure 3:
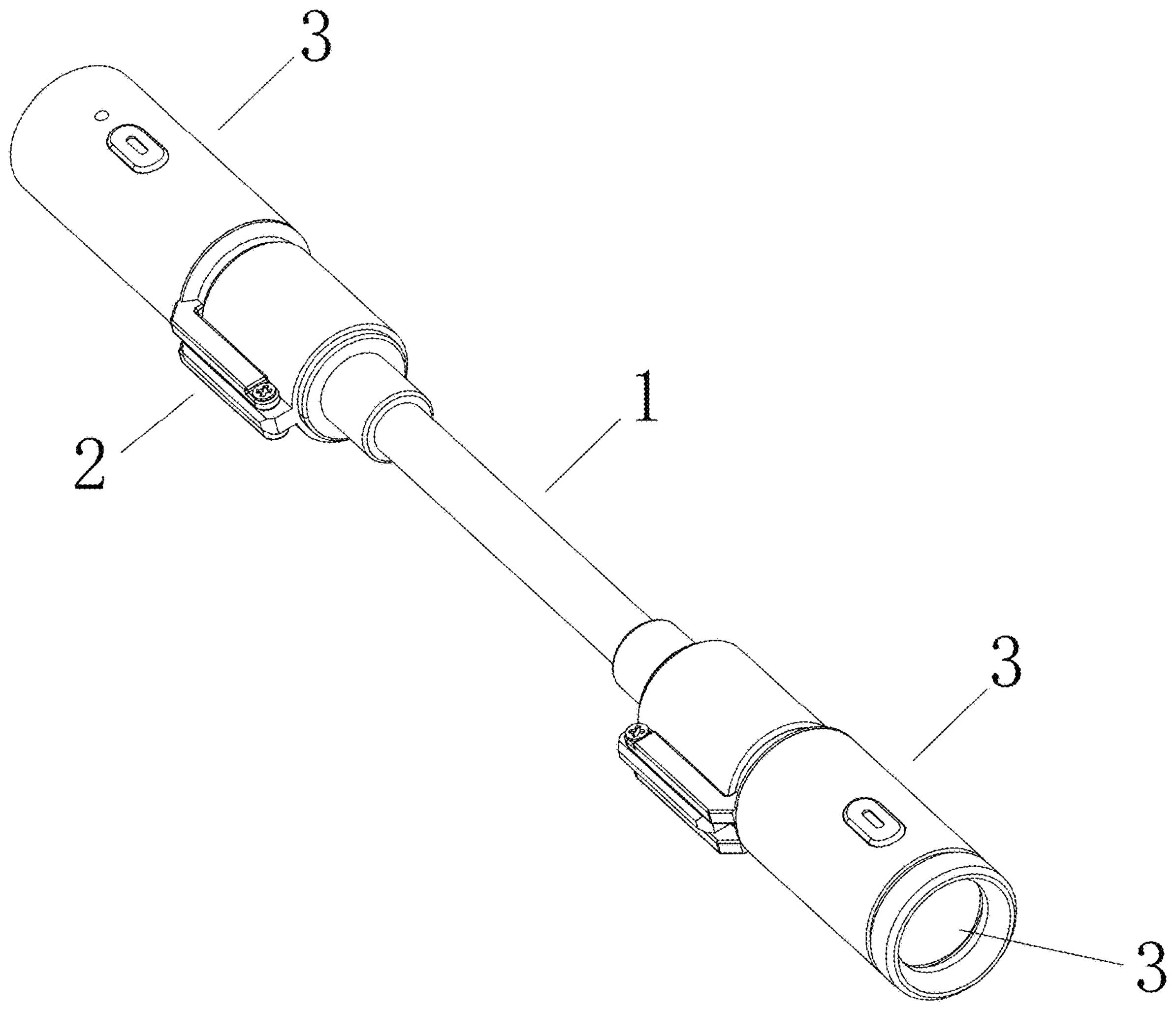
FIG. 3 is a first structural schematic diagram of the present disclosure.
Figure 4:
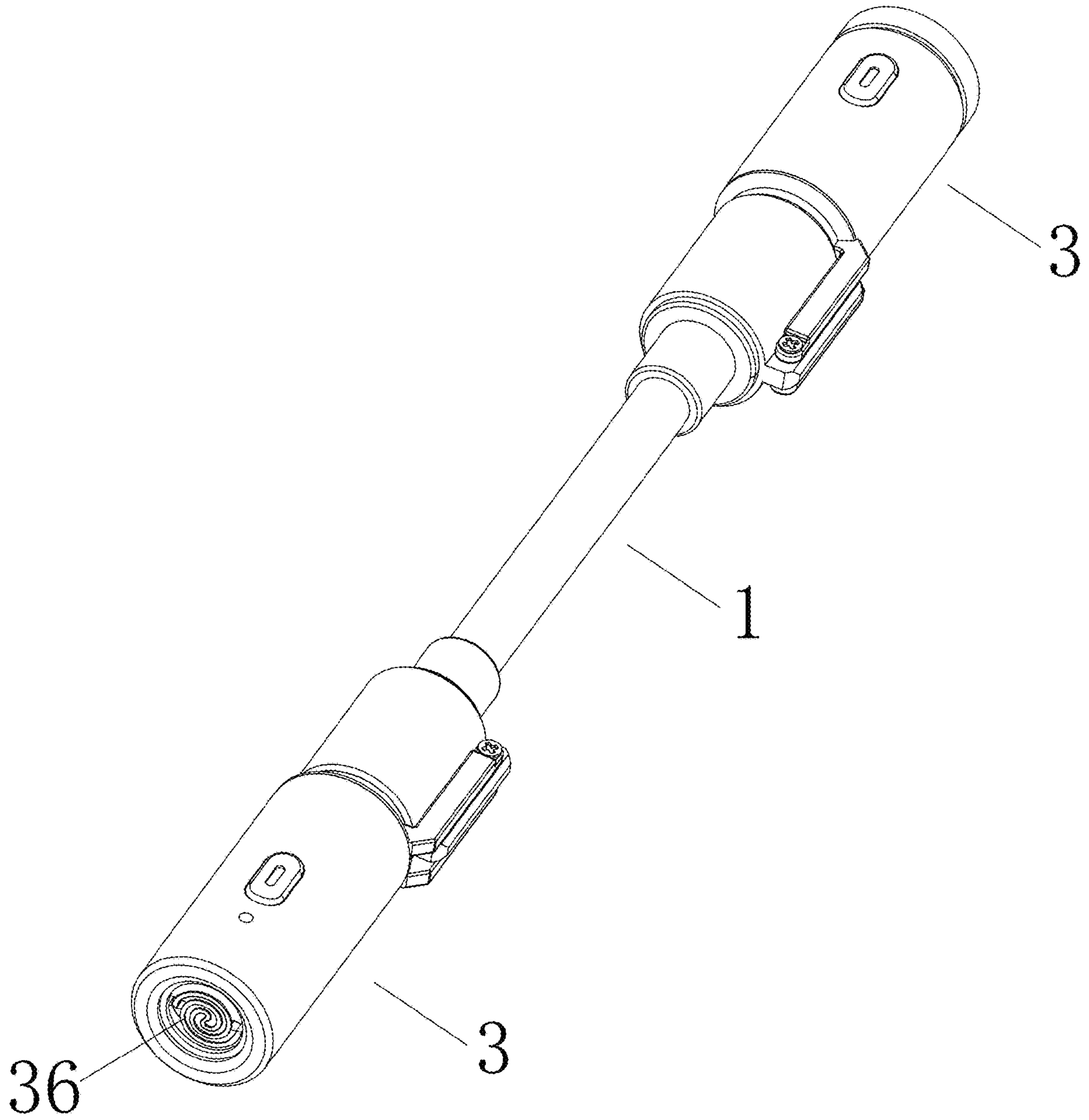
FIG. 4 is a second structural schematic diagram of the present disclosure.
Figure 5:
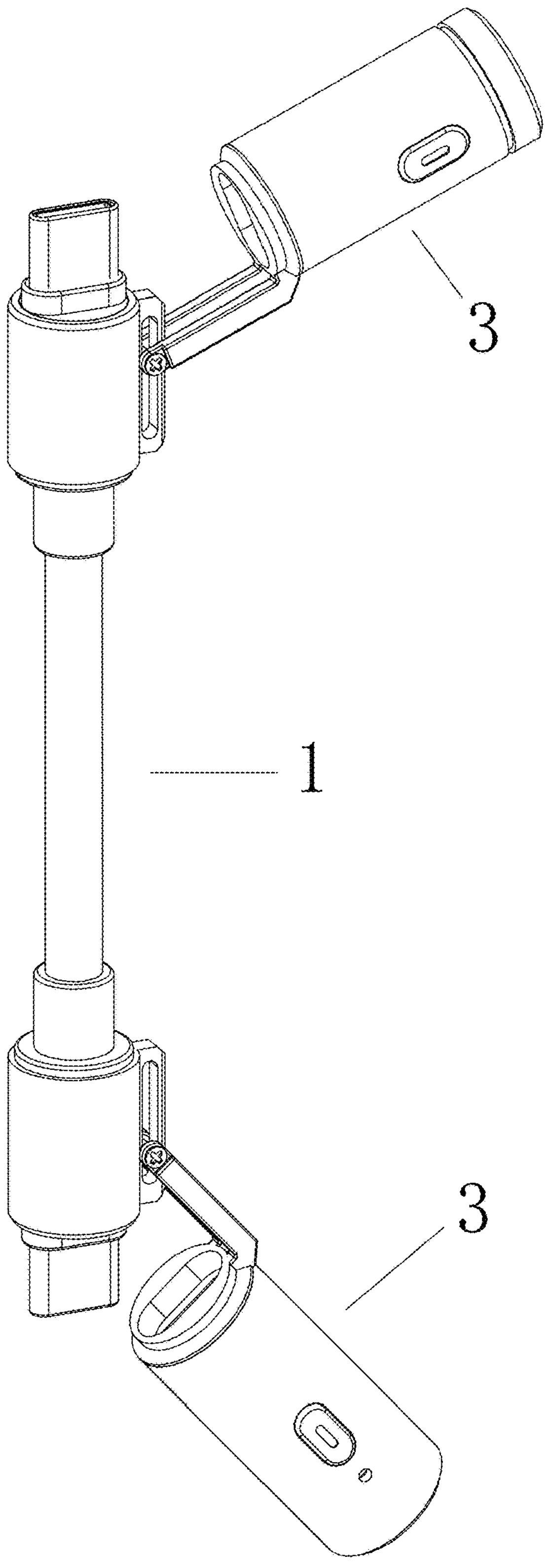
FIG. 5 is a third structural schematic diagram of the present disclosure in FIG. 3.
Figure 6:
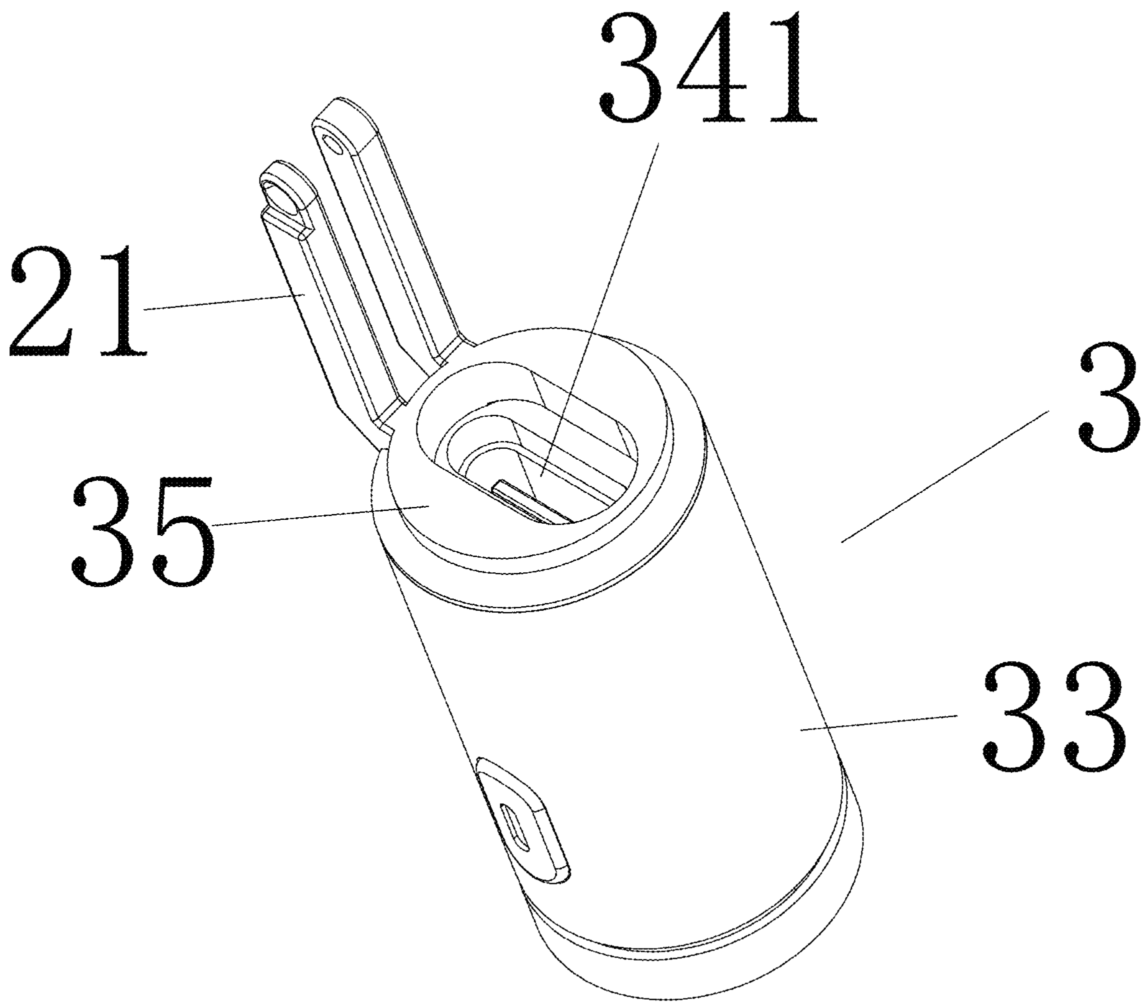
FIG. 6 is a structural schematic diagram of a portable electrical module of the present disclosure.

Please refer to FIGS. 1-6, an outdoor multifunctional data cable includes a data cable body 1, an end of the data cable body 1 is provided with a data joint 11, the data joint 11 includes a first joint 111, the data cable body 1 is movably connected to a portable electrical module 3 through a connecting mechanism 2, the connecting mechanism 2 includes a hinge arm 21 integrally connected to the portable electrical module 3, a hinge frame 23 fixed at a first joint base 112 of the data cable body 1, and a hinge bolt 22 that connects the hinge arm 21 and the hinge frame 23 in series and is movably connected to the hinge frame 23. The connecting mechanism 2 can also be magnetic suction components that are connected to each other by mutual magnetic suction, the magnetic suction components are respectively provided on the portable electrical module 3 and the first joint base 112 of the data cable body 1 to achieve a magnetic suction connection between the portable electrical module 3 and the first joint base 112. The portable electrical module 3 is provided with a second joint 341, the portable electrical module 3 is electrically connected to the first joint 111 through the second joint 341. In this embodiment, the first joint 111 is a Type-C plug, and the second joint 341 is a Type-C socket, The portable electrical module 3 achieves a detachable connection and a hot swappable electrical connection through mutual insertion of the Type-C plug and Type-C socket.

The portable electrical module 3 is a lighting module, which includes a device housing 33. The device housing 33 is in a shape of a tubular, an end of the device housing 33 is provided with a luminous bead 32; an illumination direction of the luminous bead 32 is facing an outer side of the device housing 33, an outer side of the luminous bead 32 is covered with a lampshade 31. The device housing 33 is internally provided with a circuit board component 34, and the circuit board component 34 is electrically provided with a lighting switch 342 and a second joint 341. The lighting switch 342 is provided in a predetermined through-hole of the device housing 33, the second joint 341 is provided at an end of the device housing 33 away from the luminous bead 32. A second joint base 35 is provided between joint 341 and device housing 33. The second joint base 35 is configured to fix the second joint 341. During outdoor or nighttime activities, an end of the data cable body 1 is connected to a mobile power source and the other end thereof is connected to a lighting module, which can be used for lighting purposes.

The portable electrical module 3 may be an ignition module, which includes a device housing 33. The device housing 33 is in a shape of a tubular, an end of the device housing 33 is provided with a heating wire module 36. The device housing 33 is internally provided with a circuit board component 34, which is electrically connected with an ignition switch 343 and a second joint 341; the ignition switch 343 is provided in a predetermined through-hole of the device housing 33, the second joint 341 is provided at an end of the device housing 33 away from the heating wire module 36. A second joint base 35 is provided (filled) between the second joint 341 and the device housing 33, and the second joint base 35 is configured to fix the second joint 341. The second joint 341 can be used to connect one end of the data cable body 1 to the mobile power supply and the other end thereof is connected to the ignition module. The ignition module can be used for ignition in the field or for cigarette lighting.

In summary, in the present disclosure, various optional portable electrical modules 3 are movably connected to the data cable body 1, a transmission function is retained, and an application function of the data cable is also increased, thereby improving the practicality of the data cable. At the same time, the portable electrical module 3 is integrated with the data cable body 1 for connection, which can effectively prevent the loss of the portable electrical module 3 during use and improve the portability of the portable electrical module 3.

It should be noted that in this specification, relational terms such as first and second are only used to distinguish one entity or operation from another entity or operation, and do not necessarily require or imply any actual relationship or order between these entities or operations. Moreover, terms "including", "comprising", or any other variation thereof are intended to encompass non-exclusive inclusion, such that a process, method, item, or device that includes a series of elements not only includes those elements, but also includes other elements that are not explicitly listed, or also includes elements inherent to such process, method, item, or device.

Although embodiments of the present disclosure have been shown and described, it can be understood by those skilled in the art that multiple changes, modifications, substitutions, and variations can be made to these embodiments without departing from the principles and spirit of the present disclosure. The scope of the present disclosure is limited by the accompanying claims and their equivalents.

What is claimed is:

1. A multifunctional data cable, comprising a data cable body, an end of the data cable body is provided with a data joint, the data joint comprises a first joint, wherein the data cable body is movably connected to a portable electrical module through a connecting mechanism, the portable electrical module is provided with a second joint, the portable electrical module is electrically connected to the first joint through the second joint;

wherein the portable electrical module is an ignition module, the ignition module comprises a device housing, the device housing is in a shape of a tubular, an end of the device housing is provided with a heating wire module, the device housing is internally provided with a circuit board component, the circuit board component is electrically provided with an ignition switch and the second joint, the ignition switch is provided in a predetermined through-hole of the device housing, the second joint is provided at an end of the device housing away from the heating wire module.

2. The multifunctional data cable according to claim 1, wherein the connecting mechanism comprises a hinge arm integrally connected to the portable electrical module, a hinge frame fixed at a first joint base of the data cable body, and a hinge bolt that connects the hinge arm and the hinge frame in series and is movably connected to the hinge frame.

3. The multifunctional data cable according to claim 1, wherein the connecting mechanism is magnetic suction components that are connected to each other by mutual magnetic suction, the magnetic suction components are respectively provided on the portable electrical module and a first joint base of the data cable body to achieve a magnetic suction connection between the portable electrical module and the first joint base.

4. The multifunctional data cable according to claim 1, wherein the portable electrical module is a lighting module, the lighting module comprises a device housing, the device housing is in a shape of a tubular, an end of the device housing is provided with a luminous bead, an illumination direction of the luminous bead is facing towards an outer side of the device housing, an outer side of the luminous bead is covered with a lampshade, the device housing is internally provided with a circuit board component, the electrical circuit board component is electrically provided with a lighting switch and the second joint, wherein the lighting switch is provided in a predetermined through-hole of the device housing, the second joint is provided at an end of the device housing away from the luminous bead.

5. The multifunctional data cable according to claim 4, wherein a second joint base is provided between the second joint and the device housing, and the second joint base is configured to fix the second joint.

6. The multifunctional data cable according to claim 1, wherein a second joint base is provided between the second joint and the device housing, and the second joint base is configured to fix the second joint.

7. The multifunctional data cable according to claim 1, wherein the first joint is a Type-C plug, the second joint is a Type-C socket, the portable electrical module achieves a detachable connection and a hot swappable electrical connection through mutual insertion of the Type-C plug and Type-C socket.

* * * * *